US008142276B1

(12) United States Patent
Gianti, Jr.

(10) Patent No.: US 8,142,276 B1
(45) Date of Patent: Mar. 27, 2012

(54) METHOD AND SYSTEM OF GAMING

(75) Inventor: Richard A. Gianti, Jr., Las Vegas, NV (US)

(73) Assignee: Magic7 Enterprises, LLC, Las Vegas, NV (US)

( * ) Notice: Subject to any disclaimer, the term of this patent is extended or adjusted under 35 U.S.C. 154(b) by 712 days.

(21) Appl. No.: 12/263,093

(22) Filed: Oct. 31, 2008

(51) Int. Cl.
*G06F 17/00* (2006.01)
*G06F 19/00* (2011.01)

(52) U.S. Cl. ................ 463/22; 463/19; 463/20; 463/13; 273/292; 434/292

(58) Field of Classification Search ........................ None
See application file for complete search history.

(56) References Cited

U.S. PATENT DOCUMENTS

| | | | | |
|---|---|---|---|---|
| 6,234,897 | B1 * | 5/2001 | Frohm et al. | 463/20 |
| 6,273,424 | B1 * | 8/2001 | Breeding | 273/292 |
| 6,402,149 | B1 * | 6/2002 | Chou | 273/292 |
| 6,708,975 | B1 * | 3/2004 | Fox et al. | 273/292 |
| 7,537,456 | B2 * | 5/2009 | Snow | 434/292 |
| 2003/0064768 | A1 * | 4/2003 | Fier | 463/13 |
| 2008/0139282 | A1 * | 6/2008 | Seelig et al. | 463/19 |

* cited by examiner

*Primary Examiner* — Paul A D'Agostino
(74) *Attorney, Agent, or Firm* — Greenberg Traurig

(57) ABSTRACT

A method and system of gaming. A game has three tiers including a primary game, bonus game and secondary bonus game. The primary game involves two player cards and a sum value thereof. The bonus game involves a combination of the two player cards and three bonus cards and a poker rank thereof. A secondary bonus game is triggered responsive to a rank, value and/or position associated with the player cards, bonus cards or combinations thereof. The secondary bonus game comprises a Magic Ball or Magic 7 Icons.

4 Claims, 15 Drawing Sheets

240

| | |
|---|---|
| Over 7 | 1 to 1 |
| Under 7 | 1 to 1 |
| 7 | 4 to 1 |

245

| | |
|---|---|
| 4 Red/Black Aces and Joker | 1000 to 1 |
| Straight Flush | 200 to 1 |
| 5 of a Kind | 50 to 1 |
| Flush | 20 to 1 |
| 4 of a Kind | 9 to 1 |
| Full House | 4 to 1 |
| Straight | 3 to 1 |
| 3 of a Kind | 1 to 1 |
| Pair of Aces/Two Pair | Push |

Fig. 6

METHOD AND SYSTEM OF GAMING

FIELD OF THE INVENTION

The embodiments of the present invention relate to electronic gaming devices and a method of playing a card game facilitated by the same.

BACKGROUND

Electronic gaming devices, such as slot machines, video poker machines and keno machines, now generate more revenue than table games. Specifically, the popularity of slot games and video poker games has increased with the number of game variations being offered.

With the poker boom in full effect, electronic gaming machines and devices utilizing playing cards are gaining momentum. To that end, there continues to be a need for new card games facilitated by electronic gaming machines and devices.

SUMMARY

Accordingly, a first embodiment of the present invention comprises a method of operating an electronic wagering device comprising: accepting a game wager on a game outcome; accepting a bonus wager based on a player hand rank; randomly arranging a simulated deck of cards wherein said deck of cards includes at least two jokers, and ace through six of spade, heart, diamond and club suits, wherein jokers are ranked as an ace or six of any suit at the discretion of the player; displaying two player cards face up; displaying three bonus cards face up; determining a value of the two player cards and resolving said game wager based on whether the player hand value is less than seven, greater than seven or exactly seven; determining a rank of a player hand formed of said two player cards in combination with said three bonus cards; and triggering a secondary bonus game based on a rank, value and/or position associated with the player cards, bonus cards or combinations thereof.

A second embodiment of the present invention comprises an electronic gaming device comprising: a display; a random number generator; means for accepting a game wager on a game outcome and bonus wager based on a player hand rank; a processor configured to: randomly arrange a simulated deck of cards wherein said deck of cards includes at least two jokers, and ace through six of spade, heart, diamond and club suits, wherein jokers are ranked as ace or six of any suit at the discretion of the player; display two player cards face up on said display; display three bonus cards face up on said display; determine a value of the two player cards and resolve said game wager based on whether the player hand value is less than seven, greater than seven or exactly seven; determine a rank of a player hand formed of said two player cards in combination with said three bonus cards; and trigger a secondary bonus game based on a rank, value and/or position associated with the player cards, bonus cards or combinations thereof.

The embodiments of the present invention provide multiple games within in a single game. In one embodiment, the game includes a primary outcome, first bonus outcome and secondary bonus outcome such that a player has three chances to win. The secondary bonus games may take many forms as described in detail below.

Other variations, embodiments and features of the present invention will become evident from the following detailed description, drawings and claims.

BRIEF DESCRIPTION OF THE DRAWINGS

FIG. 6 shows exemplary pay tables associated with a primary and bonus game of the embodiments of the present invention;

DETAILED DESCRIPTION

Figure 1:
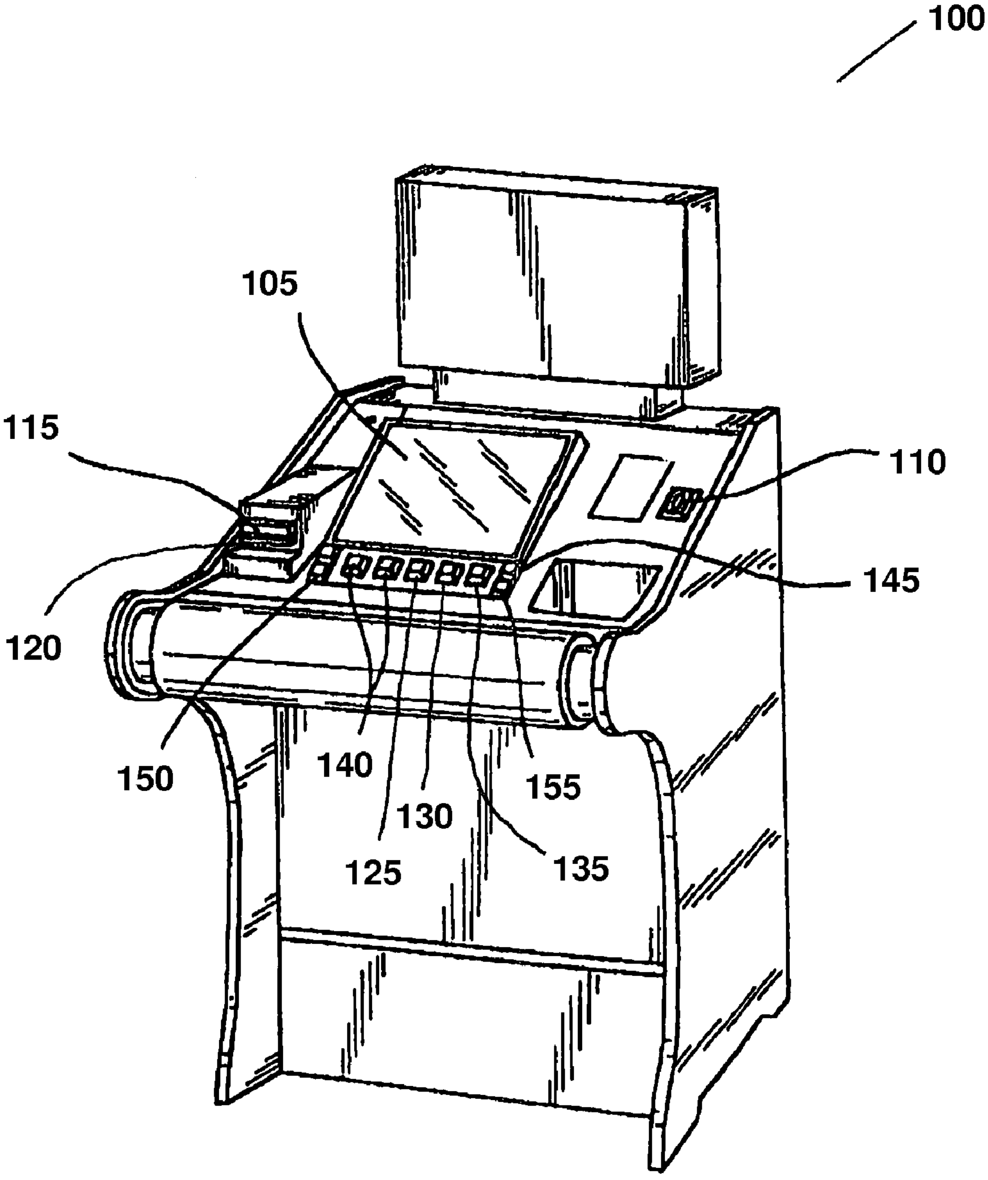
FIG. 1 shows a conventional video slot machine.

The operation of electronic gaming devices is controlled by microprocessors which communicate with internal memory devices and the external features of the machines. The microprocessors also incorporate, or communicate with, a random number generator which ensures the randomness of the devices' outcomes. In the embodiments of the present invention, one or more processors, along with memory and related devices, control the new applications disclosed herein. Therefore, the embodiments, along with the corresponding odds, of the present invention may be programmed into the processor or associated software. Since the technology for operating and controlling electronic gaming devices is well known to those skilled in the art, the subtle details are not described herein.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

In the embodiments of the present invention as described below, a modified deck of 50 cards comprising two jokers and two sets of aces through sixes of spades, hearts, clubs and diamonds. Jokers are quasi-wild and may be used as an Ace or six of any suit. One or more modified decks of cards may be used with the embodiments of the present invention. The embodiments of the present invention relate to U.S. Pat. No. 6,402,149 assigned to the assignee of this application. The complete disclosure of U.S. Pat. No. 6,402,149 is incorporated by reference herein for all purposes.

Reference is now made to the figures wherein like parts are referred to by like numerals throughout. FIG. 1 shows a conventional electronic gaming device or machine that may be used to facilitate the embodiments of the present invention and is generally referred to by reference numeral 100. The device 100 includes a video display, monitor or screen 105, coin input 110, bill/coupon validator 115, card reader 120 and interface buttons including three primary game wager buttons 125, 130 and 135, bonus game wager button 140, deal button 145, cash out button 150 and secondary bonus game input button 155. The three game wager buttons 125, 130 and 135 correspond to outcomes of less than seven, greater than seven or exactly seven, respectively. While interface buttons are shown, it is also conceivable that touch screen technology may be utilized as a player interface.

Figure 2:
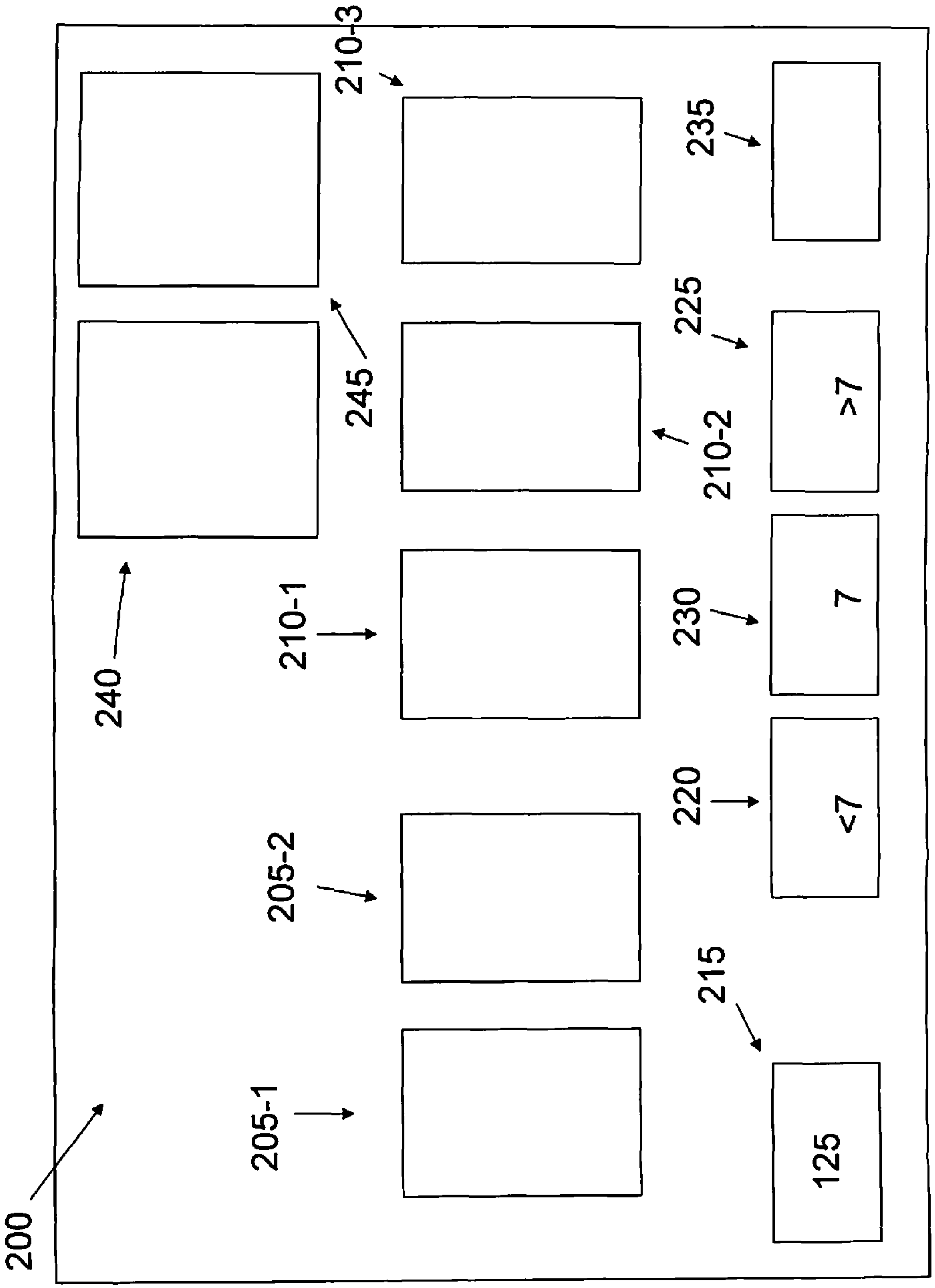
FIG. 2 shows a first screen shot of one embodiment of the present invention.
Figure 3:
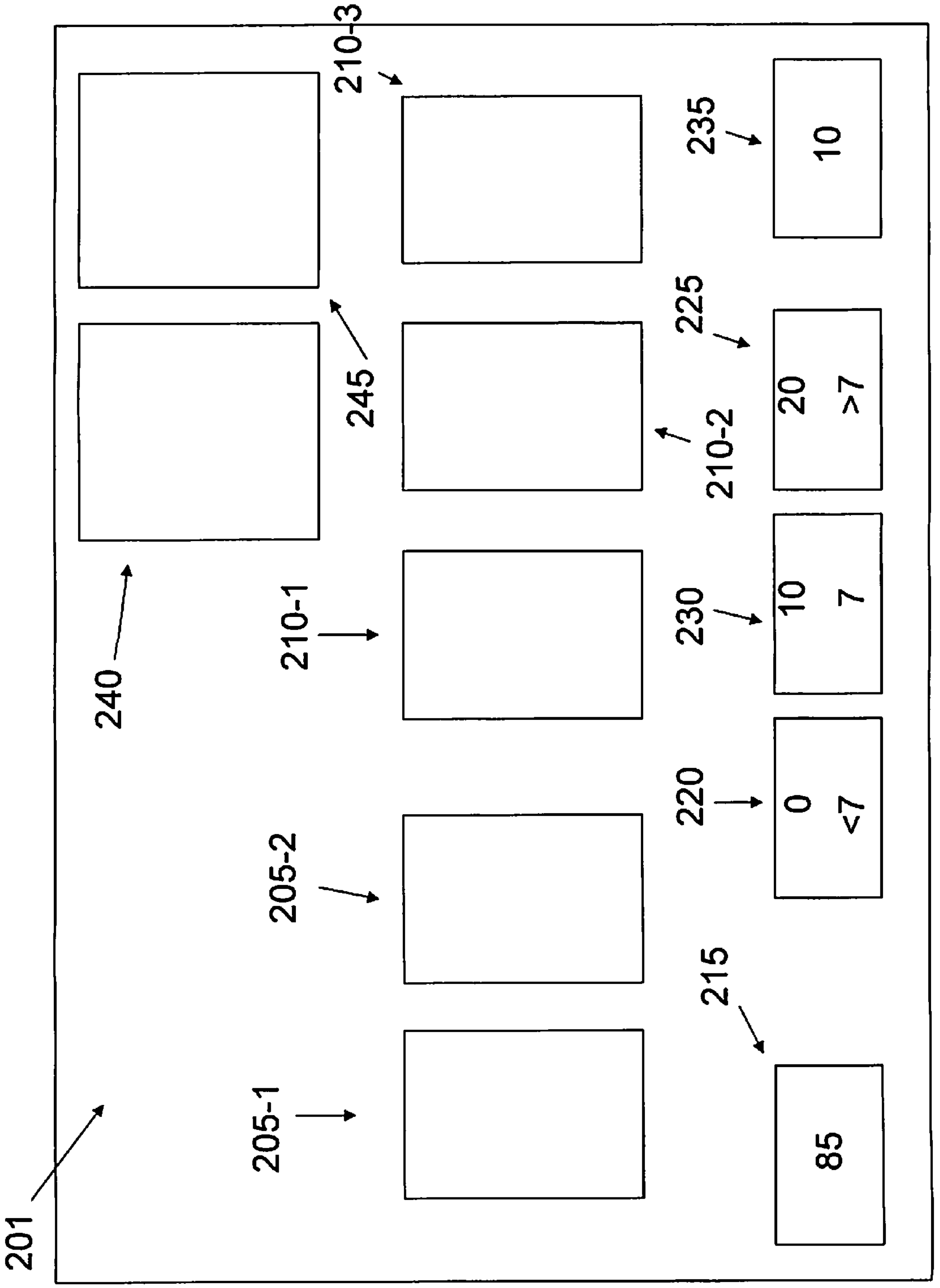
FIG. 3 shows a second screen shot of one embodiment of the present invention.
Figure 4:
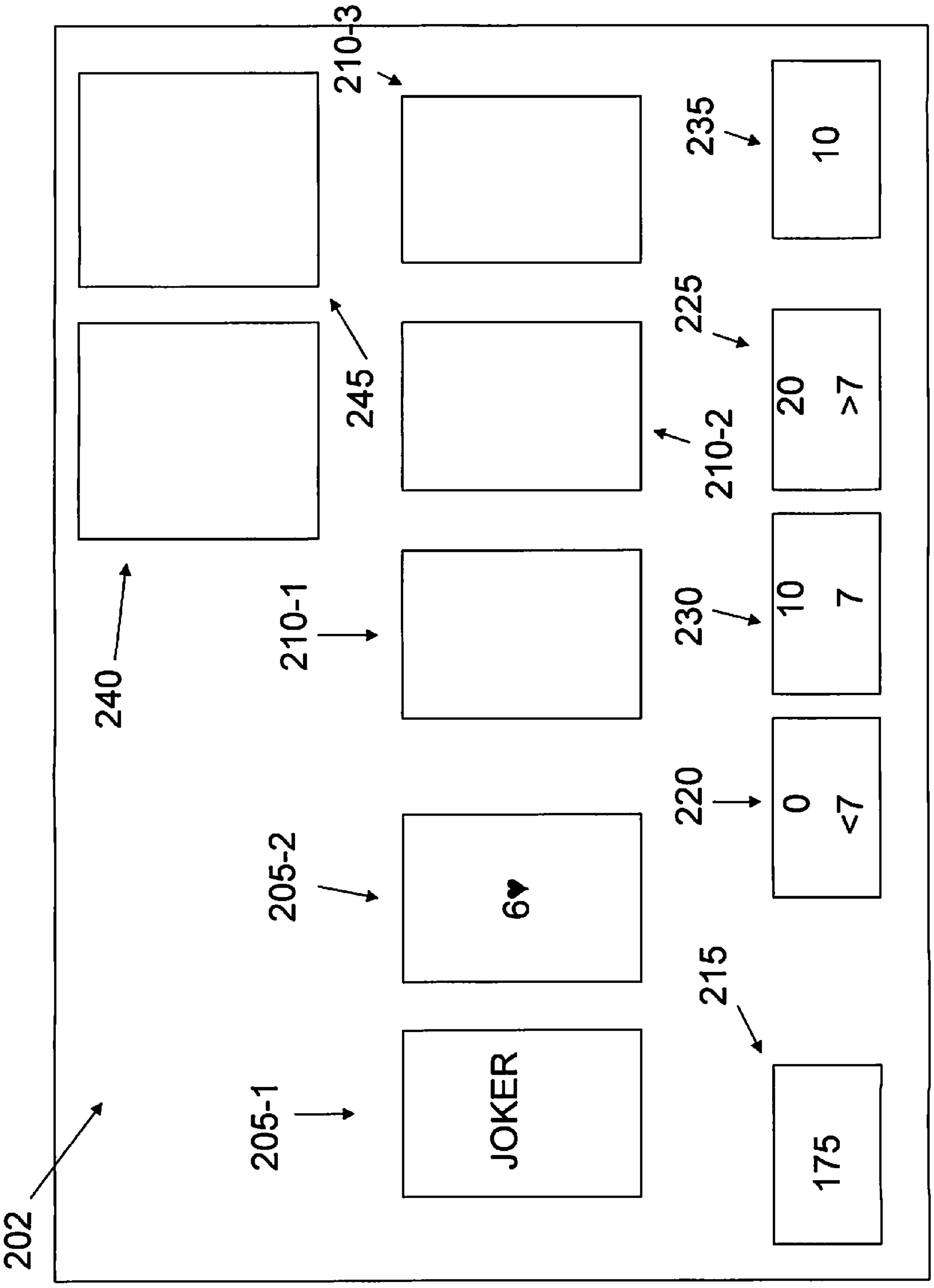
FIG. 4 shows a third screen shot of one embodiment of the present invention.

FIG. 2 shows a first screen shot 200 of one embodiment of the present invention. Two player cards 205-1, 205-2, three bonus cards 210-1, 210-2, 210-3, total credits window 215, game credits wagered windows 220, 225, 230, bonus credits wagered window 235 and pay tables 240, 245 are depicted on display 105. Pay table 240 is directed to a primary game outcome while pay table 245 is directed to a bonus game payout. The three game credits wagered windows 220, 225, 230 correspond to outcomes of less than seven, greater than seven or exactly seven, respectively. As no credits have been wagered, the two player cards 205-1, 205-2 and three dealer cards 210-1, 210-2, 210-3 are face down. In FIG. 3, a second screen shot 201 depicts the game credits wagered window 220, 225, 230 and bonus credits wagered window 225 showing 0, 20, 10 and 10 credits being wagered, respectively, and total credit window being decreased from 125 credits to 85 credits accordingly. FIG. 4 shows a third screen shot 202 with the two player cards 205-1, 205-2 being exposed as the JOKER and 6♥, respectively. At this stage of the game, the processor determines the sum value of the two player cards 205-1, 205-2 wherein the sum value is either less than seven, greater than seven or exactly seven. In one embodiment of the present invention, any JOKER may be used as a rank of one or six of any suit. In effect, the JOKER is quasi-wild as described previously and can be used in a manner at the discretion of the player.

In one embodiment, the player may use a JOKER in a first manner (e.g., rank of ace or one) during the primary game and a second manner (e.g., 6♠) during the bonus game to complete a bonus hand. In this instance, as the player wagered on greater than seven and exactly seven, according to pay table 240, the player should select to use the JOKER as an ace resulting in a hand value of exactly seven which pays 4-1 on a 20 unit wager (i.e., 100 unit payout=20 units wagered+80 units won) whereas using the JOKER as a six results in a greater than seven outcome which pays 1-1 or even money on a 10 unit wager (i.e., 20 unit payout=10 unit wagered+10 units won). In one embodiment of the present invention, the processor of the gaming device automatically provides the player with the highest payout. Alternatively, the player may have the option to choose. In another embodiment of the present invention, the player may use a JOKER as an ace and six to win an exactly even wager and greater than seven wager. So, in such an embodiment, the exemplary player cards 205-1, 205-2 shown in FIG. 4 result in the player winning the exactly even outcome (i.e., JOKER used as ace) and the greater than seven (i.e., JOKER used as six) for a total of 90 credits which have been added to the total credits window 215.

Figure 5:
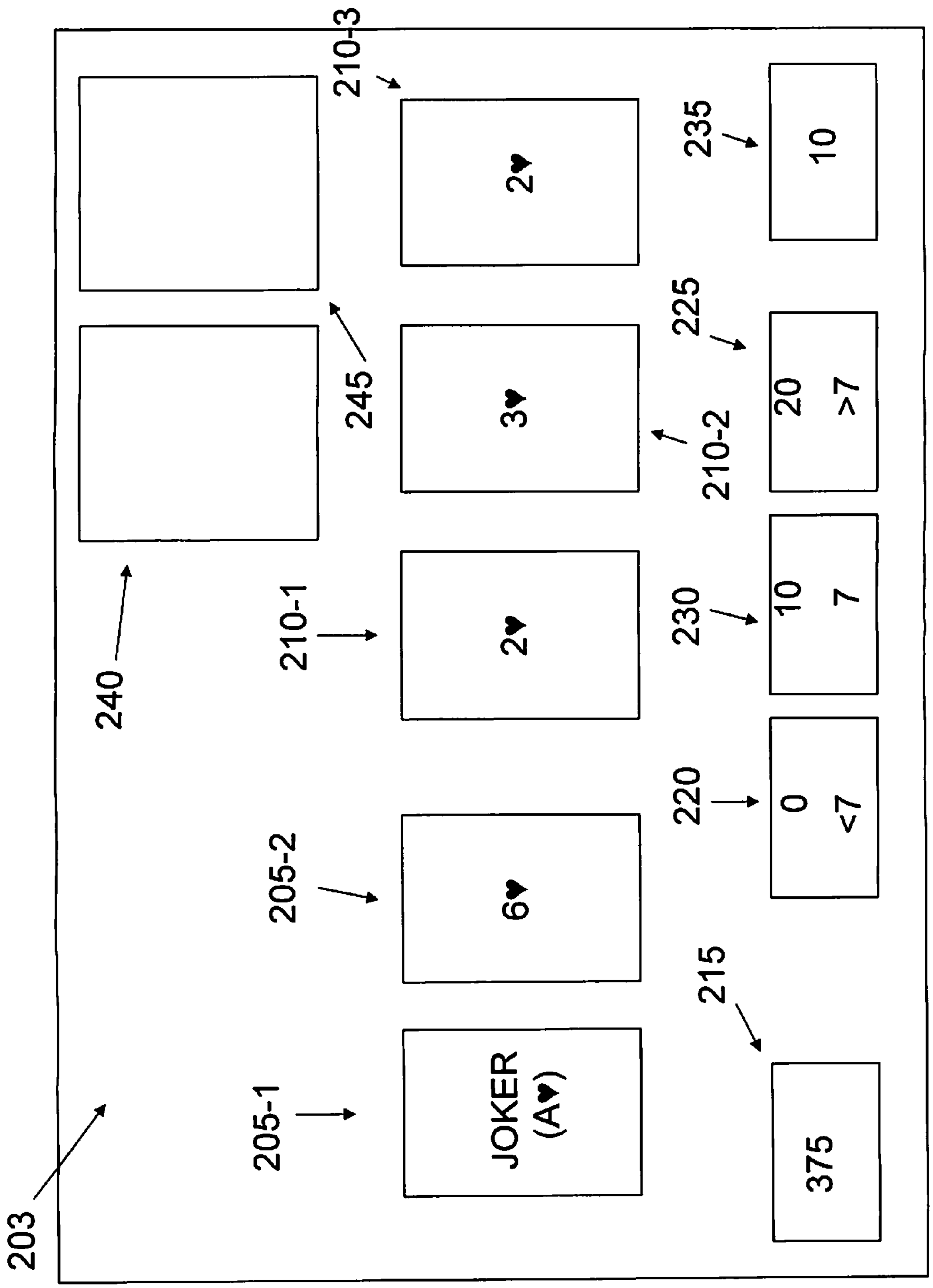
FIG. 5 shows a fourth screen shot of one embodiment of the present invention.

After the primary game outcome is determined, the three bonus cards comprising the 2♥, 3♥ and 2♥ are exposed as shown in screen shot 203 of FIG. 5. At this stage, the processor determines if the two player cards 205-1, 205-2 and three bonus cards 210-1, 210-2, 210-3 form a winning bonus poker hand as established by pay table 245. In this instance, the JOKER is used as a A♥ to form a flush (i.e., five hearts). FIG. 6 shows two exemplary pay tables 240, 245 associated with the primary game and bonus game outcomes of the embodiments of the present invention. In this instance, the flush pays 20-1 on the 10 credit wager resulting in a total 200 credit payout as reflected in the total credits window 215.

In one embodiment of the present invention, players are able to increase the bonus wager after viewing the two player cards 205-1, 205-2. Such an increase may be limited (e.g., doubling of the bonus wager) or may be only limited by a device betting limit (e.g., 500 units). In other embodiments, the amount of the bonus wager may be reduced or a portion may be sacrificed after the two player cards 205-1, 205-2 are exposed. In such embodiments, after the exposure of the two player cards, the game device prompts the player to increase, decrease or sacrifice a portion of the bonus wager.

While exposure of the two player cards 205-1, 205-2 and the three bonus cards 210-1, 210-2, 210-3 is depicted as two separate events, it is also conceivable that the two player cards 205-1, 205-2 and three bonus cards 210-1, 210-2, 210-3 may be exposed simultaneously. In such an embodiment, no betting is permitted after the initial wagers are made prior to the exposure of any cards.

Various secondary bonus games which require no additional player wager are also implemented in certain embodiments of the present invention. The secondary bonus games are triggered based on a rank, value and/or position associated with the player cards, bonus cards or combinations thereof.

Figure 7:
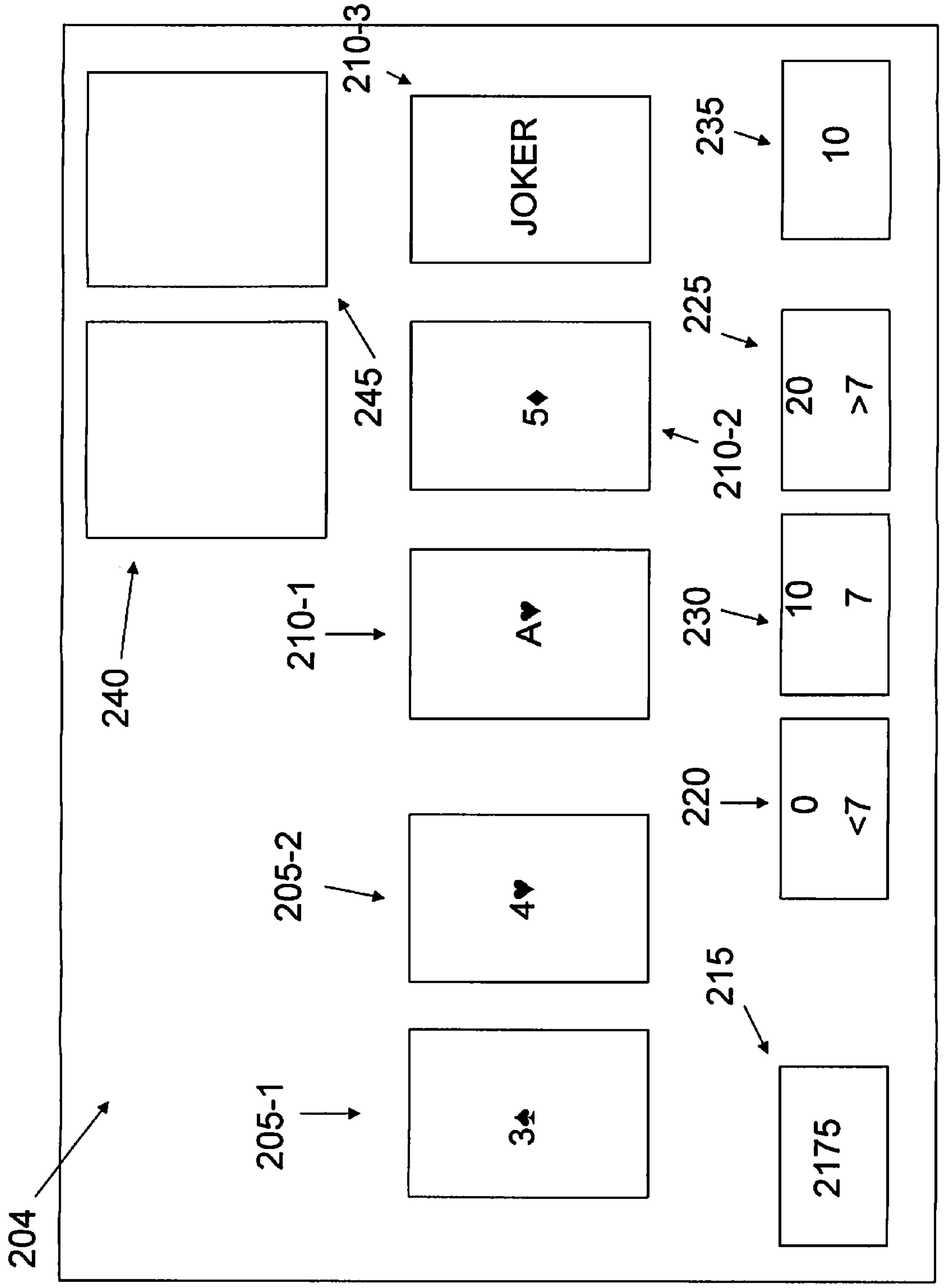
FIGS. 7-11 show screen shots associated with secondary bonus games associated with the embodiments of the present invention.
Figure 8:
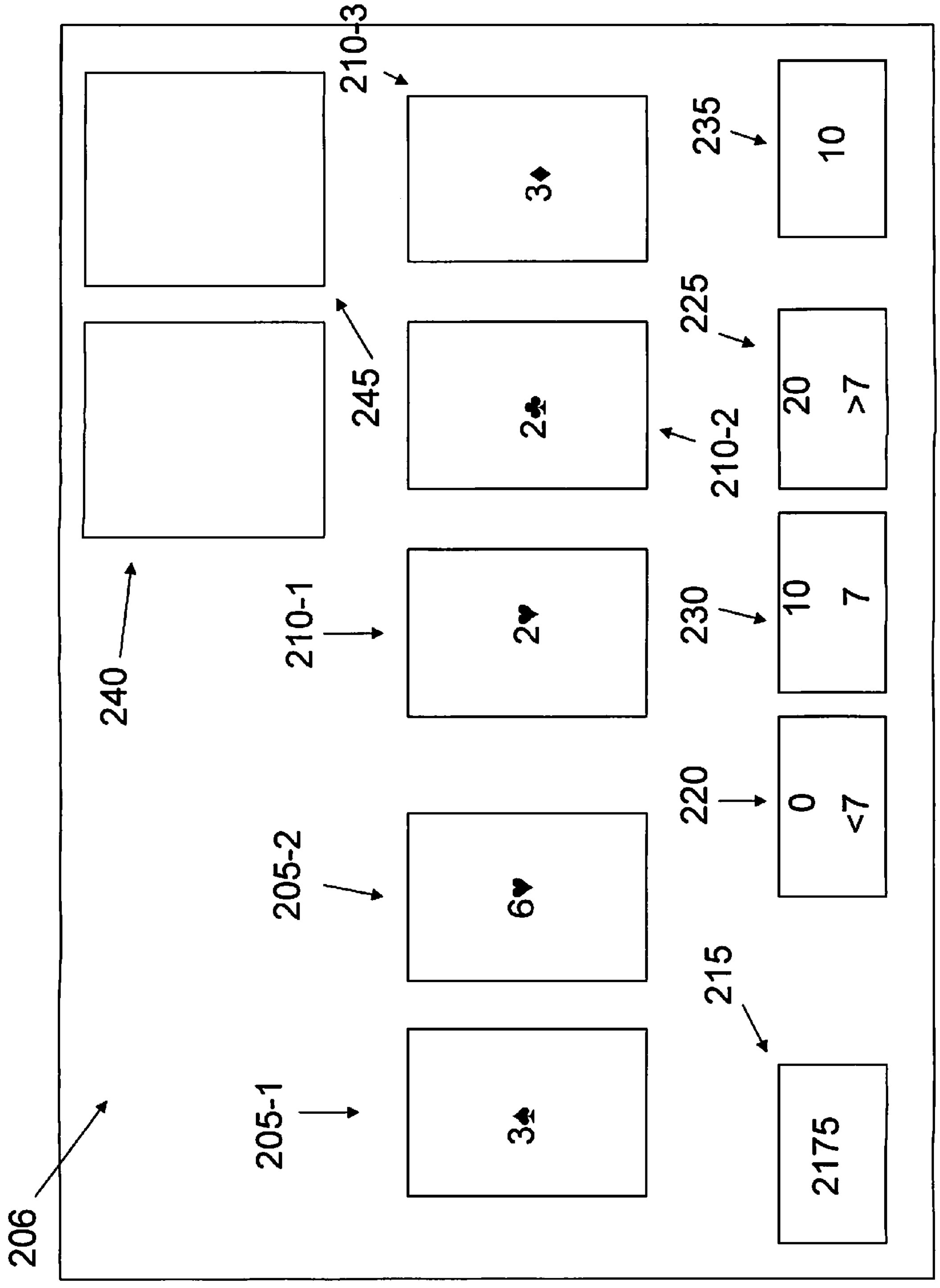
Figure 9:
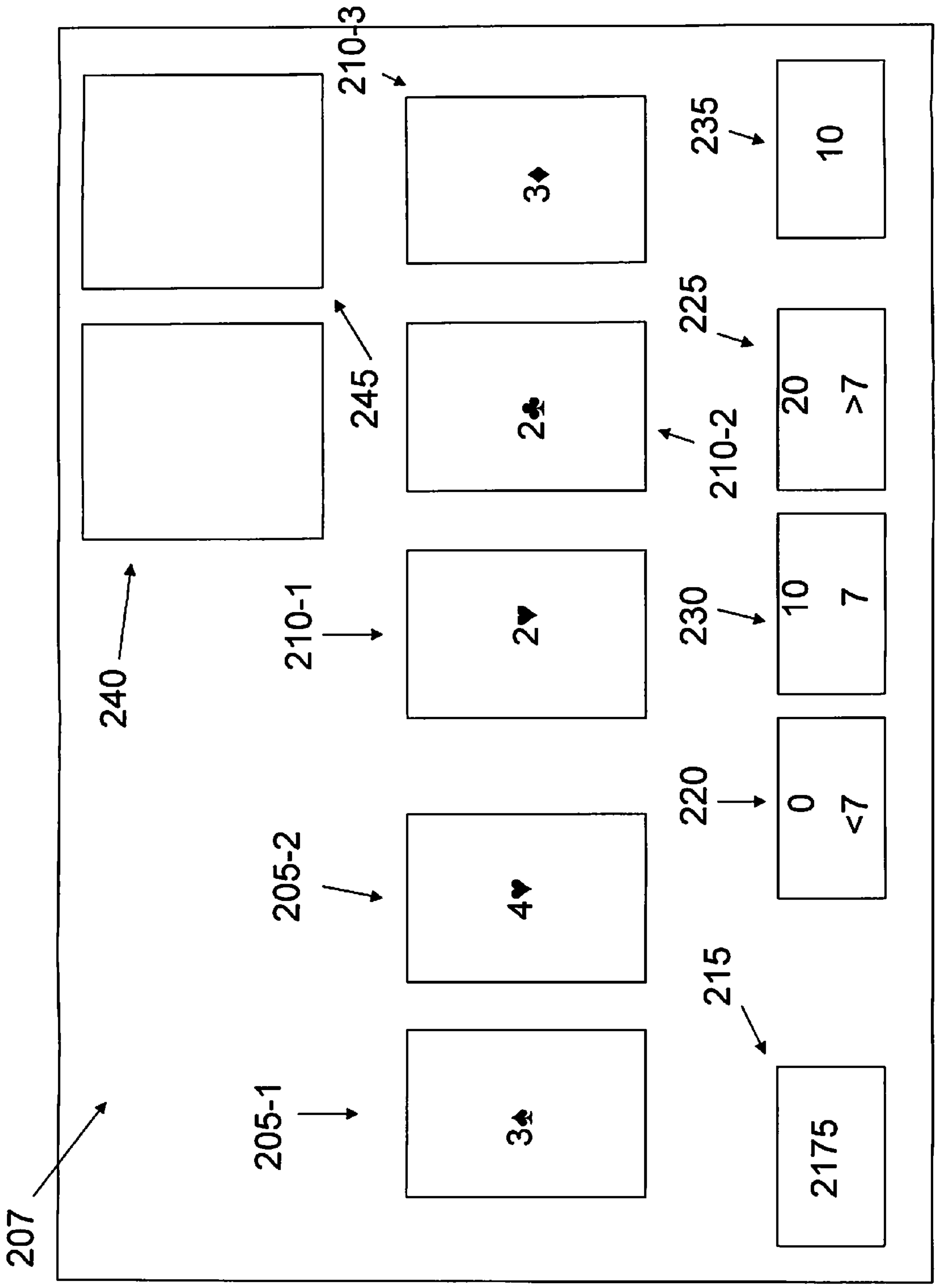
Figure 10:
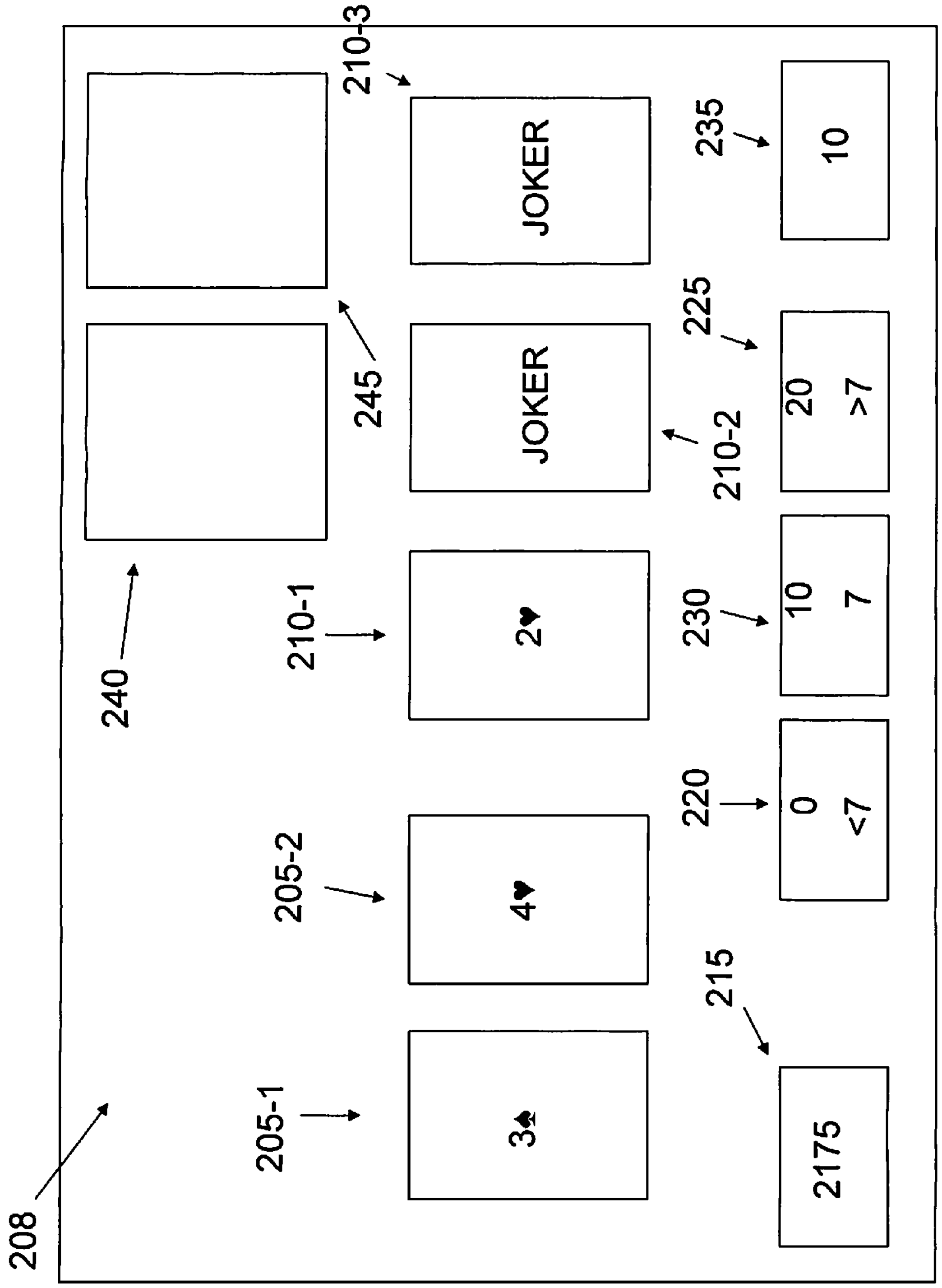
Figure 11:
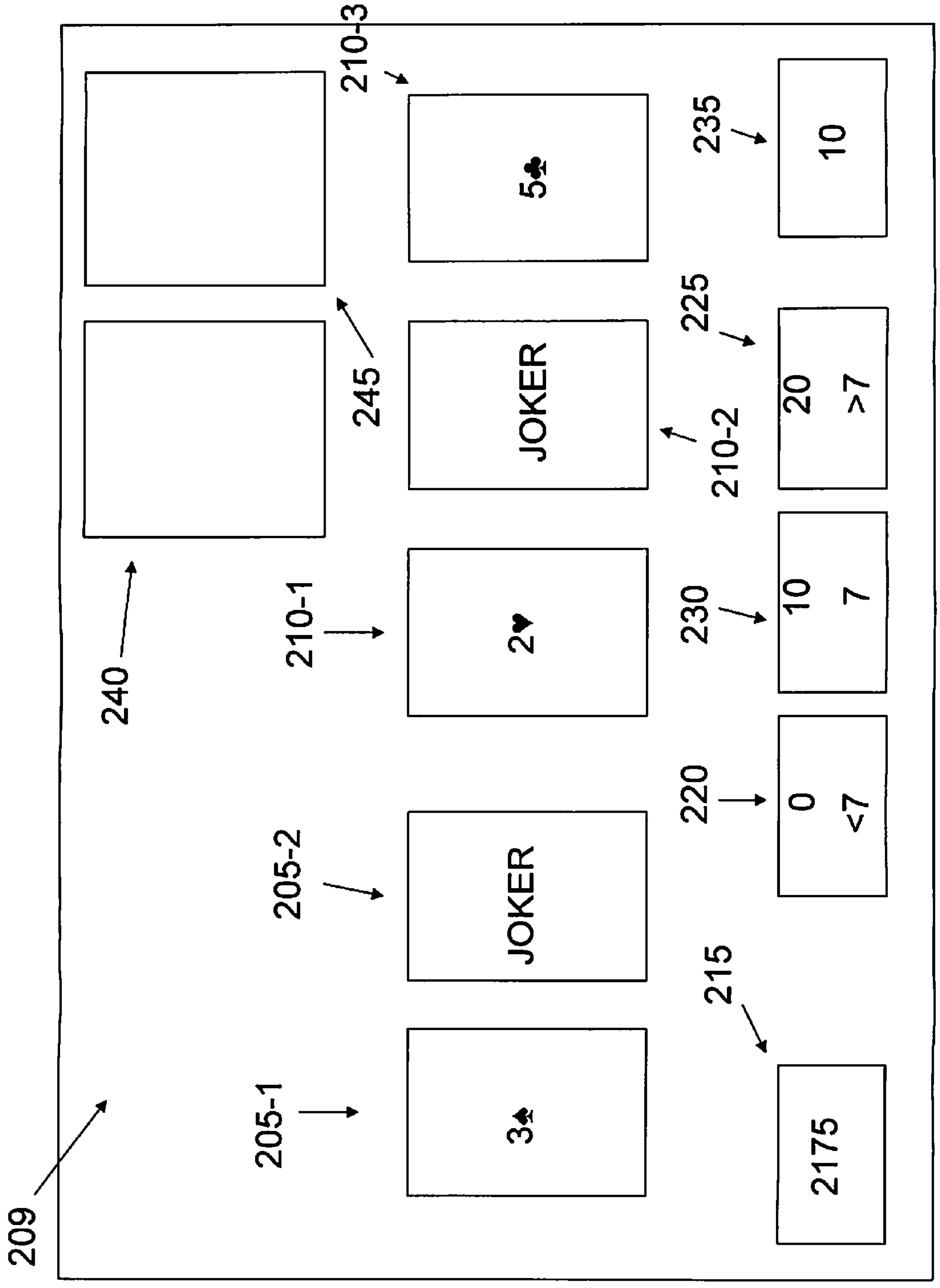

In a first embodiment, as shown in screen shot 204 of FIG. 7, the secondary bonus game is triggered responsive to a JOKER being dealt as the third bonus card 210-3 or fifth and final card when included with the two player cards 205-1, 205-2. In another embodiment, as shown in screen shot 206 of FIG. 8, the secondary bonus is triggered responsive to the three bonus cards 210-1, 210-2, 210-3 having a sum value of seven. In another embodiment, as shown in screen shot 207 of FIG. 9, the secondary bonus is triggered responsive to the two player cards 205-1, 205-2 having a sum value of seven and the three bonus cards 210-1, 210-2, 210-3 having a sum value of seven. In another embodiment, as shown in screen shot 208 of FIG. 10, the secondary bonus is triggered responsive to the three bonus cards 210-1, 210-2, 210-3 including two JOKERs. In another embodiment, as shown in screen shot 209 of FIG. 11, the secondary bonus is triggered responsive to the two player cards 205-1, 205-2 and the three bonus cards 210-1, 210-2, 210-3 including two JOKERs. Other secondary bonus triggers are conceivable.

Figure 12:
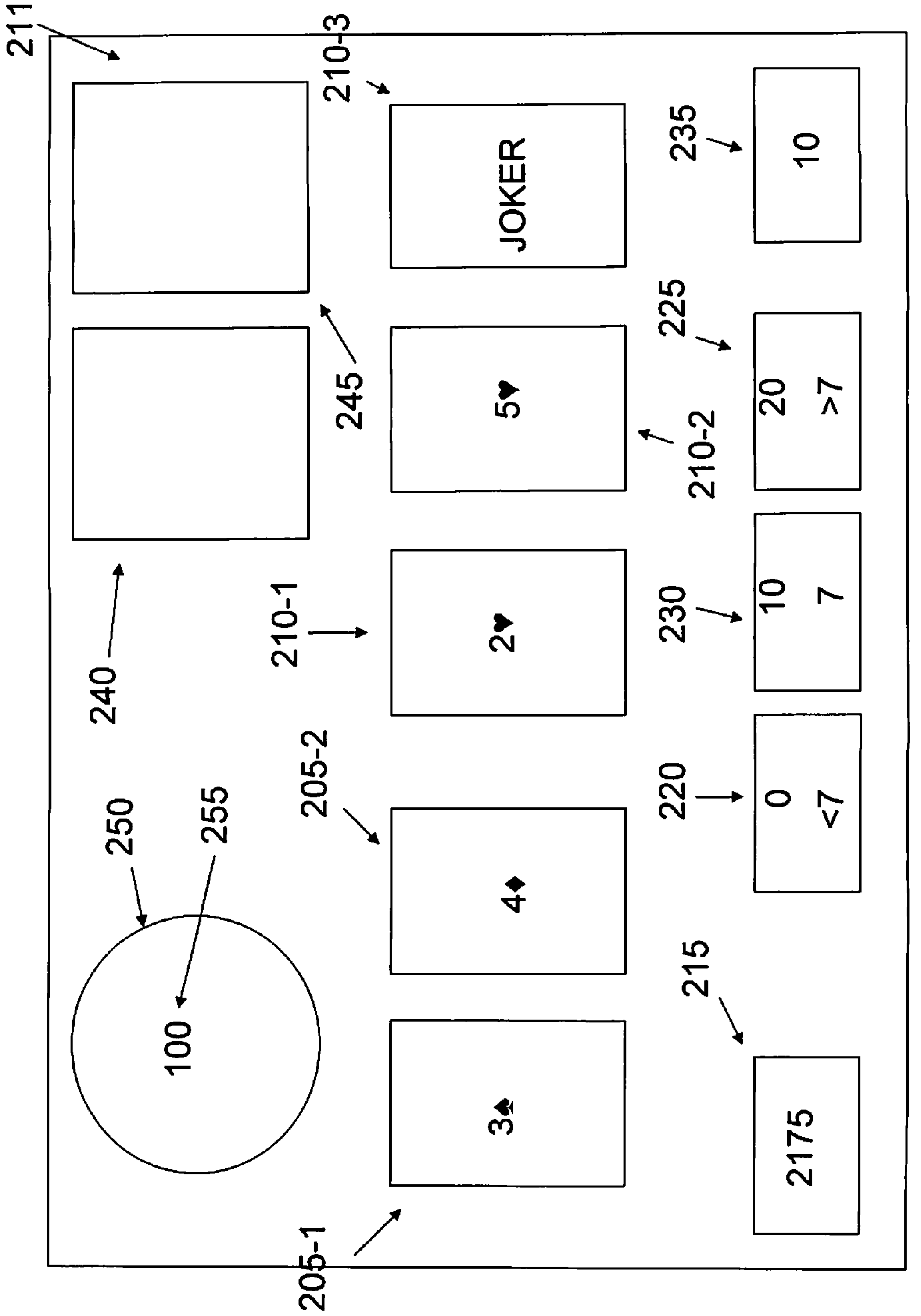
FIG. 12 shows a first secondary bonus game design.

In one embodiment, as shown in screen shot 211 of FIG. 12, the secondary bonus game takes the form of a "Magic Ball" 250 on the game display 105 or a game device topper. The Magic Ball 250 may be mechanical, video or backlit. Responsive to the third bonus card 210-3 being a JOKER (or any other secondary bonus game trigger), the player is prompted to activate the Magic Ball 250 via a player interface button or touch screen icon on the display 105. Once activated, the Magic Ball 250 randomly shows potential bonus award amounts until a final bonus award amount 255 is identified and awarded. With such an embodiment, to maintain excitement and anticipation, large and small bonus award amounts are randomly presented until the final bonus award amount is identified. While the Magic Ball 250 is shown in a corner of the screen, it is conceivable that the Magic Ball may be depicted on the entire screen as the player cards 205-1, 205-2 and bonus cards 210-1, 210-2, 210-3 are removed.

Figure 13:
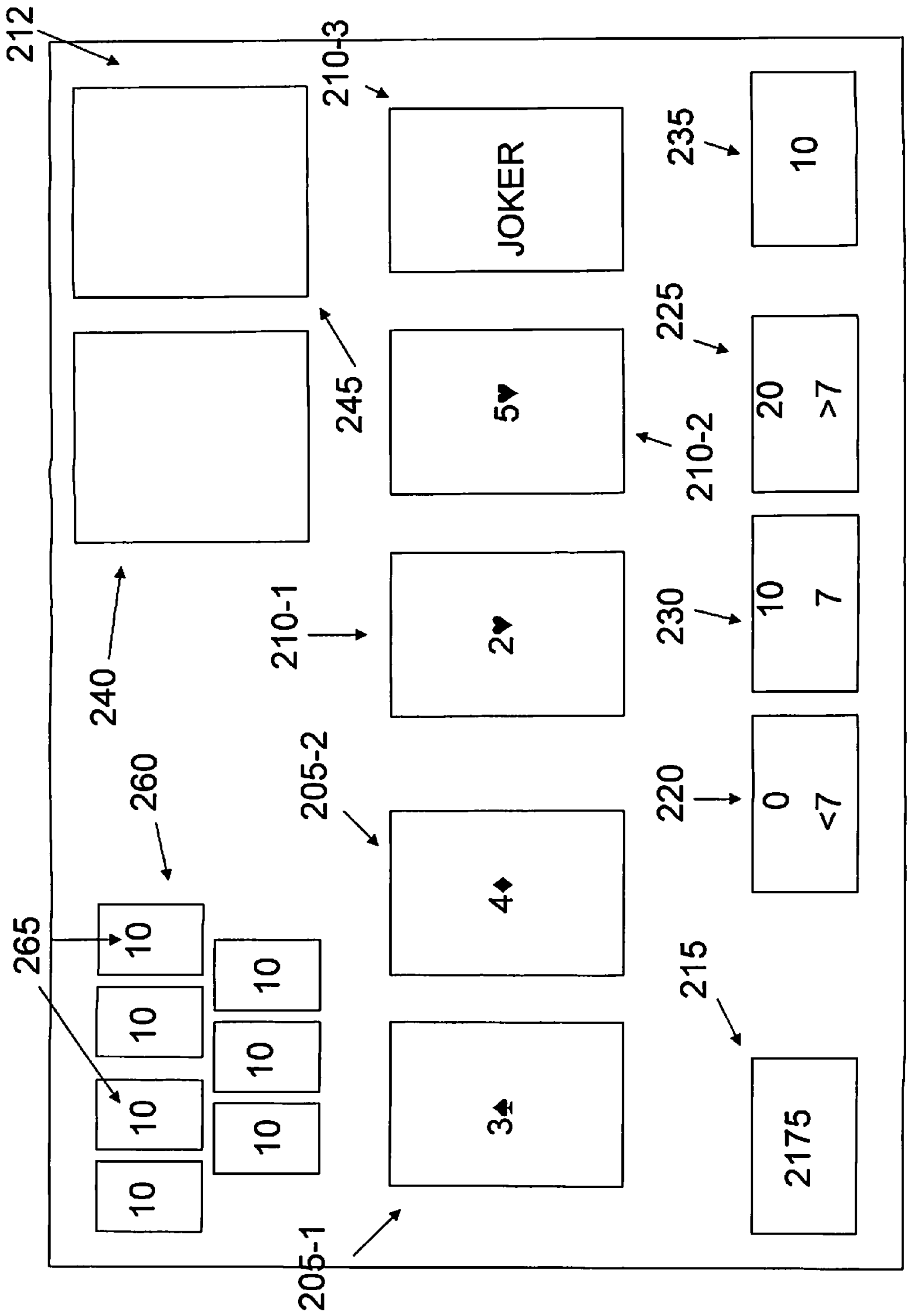
FIG. 13 shows a second secondary bonus game design.

In another embodiment, as shown in screen shot 212 of FIG. 13, the secondary bonus game takes the form of five to ten "Magic 7 Icons." The Magic 7 Icons 260 depicting bonus award amounts 265 may be presented on the display 105 or on game device topper in mechanical, video or backlit form. In this embodiment, responsive to the secondary bonus game being triggered, the Magic 7 Icons 260 randomly illuminate and turn off until one or more Magic 7 Icons 260 and corresponding bonus award amounts (e.g., 10 credits) remain illuminated thereby identifying one or more bonus award amounts. In one embodiment, play continues with one or more Magic 7 Icons illuminated with the player attempting to illuminate all of the Magic 7 Icons during the game session. In other words, the player needs to reach the secondary bonus game multiple times to cause all Magic 7 Icons to remain illuminated. In another embodiment, the secondary bonus game comprising the Magic 7 Icons 260 is a single event during which one or more or all of the Magic 7 Icons may remain illuminated. In either embodiment, responsive to all Magic 7 Icons remaining illuminated, the player is provided the option to keep the sum of the seven bonus award amounts (e.g., 70 credits) or risk them for a potentially larger bonus award. For example, bonus award amounts ranging from 20 to 1000 credits may be available if the player elects to risk the bonus award associated with all seven Magic 7 Icons 260 illuminated. In one such embodiment, the player selects one of the Magic 7 Icons 260 by touching it or otherwise identifying it and a new award amount from 20 to 1000 credits is displayed. A weighted system is used to determine the bonus award amount such the odds of winning the larger, including maximum, bonus award amounts are in line with industry standards. While the Magic 7 Icons 260 are shown in a corner of the screen, it is conceivable that the Magic 7 Icons 260 may be depicted on the entire screen as the player cards 205-1, 205-2 and bonus cards 210-1, 210-2, 210-3 are removed.

Figure 14:
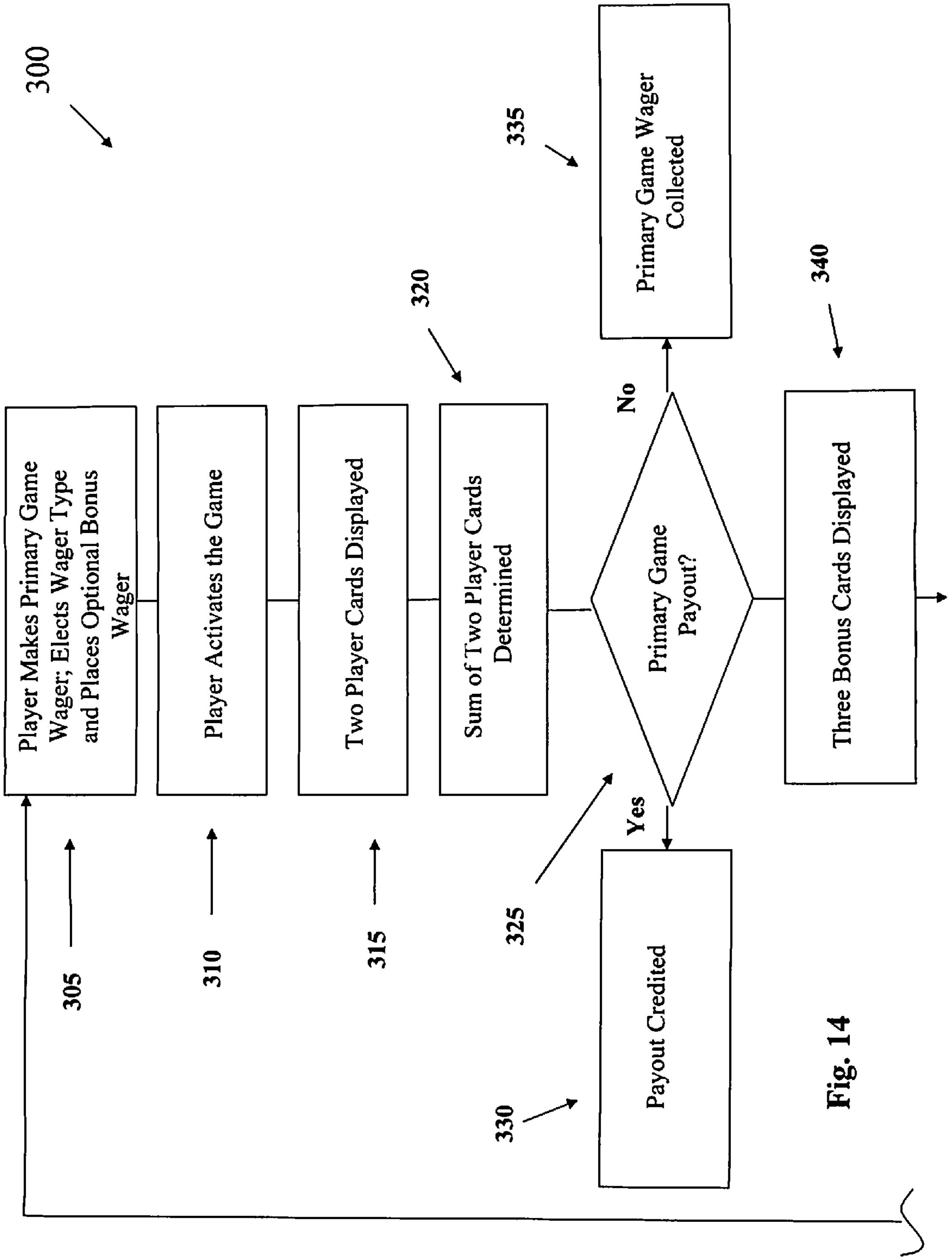
FIG. 14 shows a flow chart detailing one methodology of the playing a game according to the embodiments of the present invention.
Figure 14:
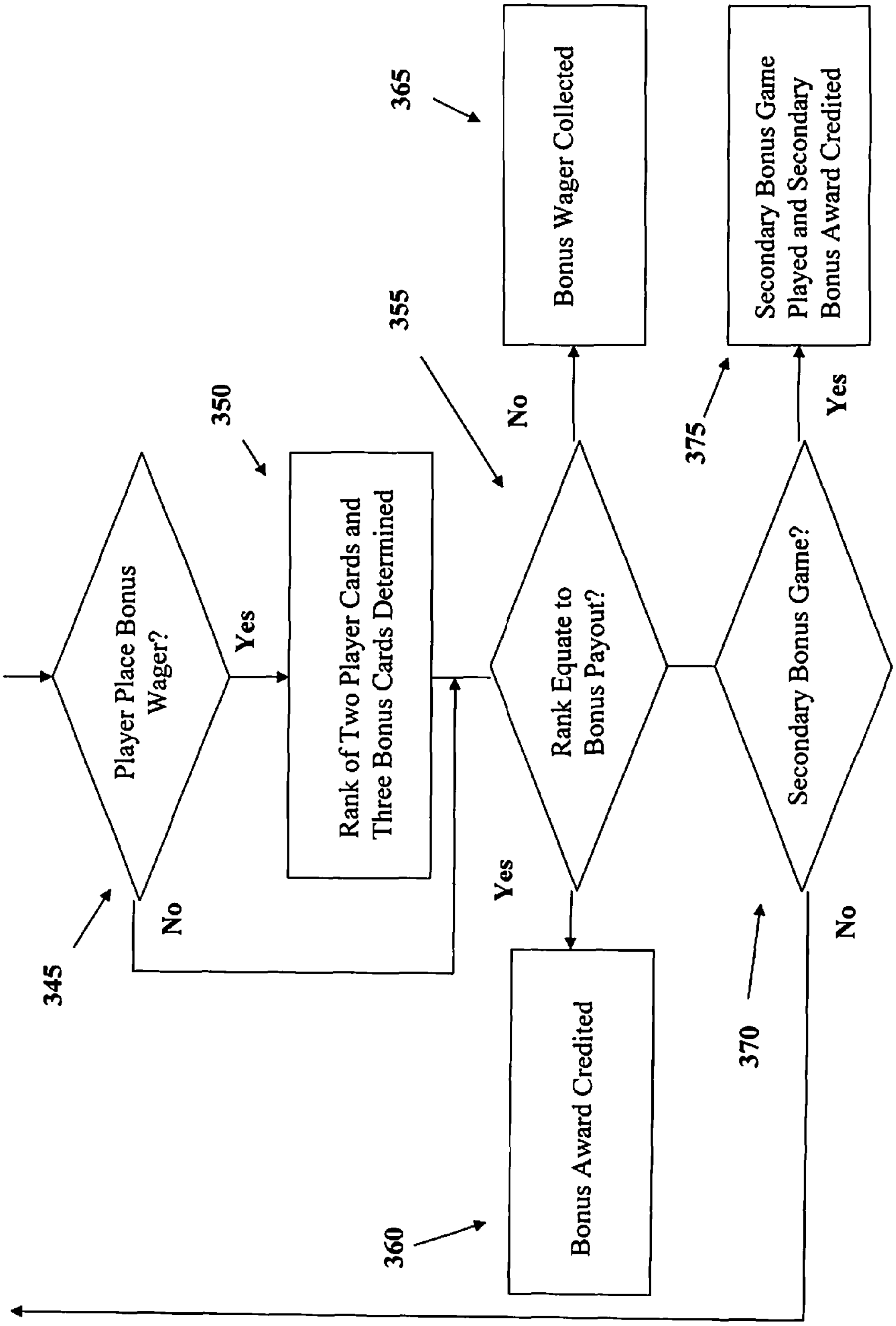

Now referring to FIG. 14, a flow chart 300 detailing one method of playing a game according to the embodiments of the present invention is shown. At 305, a player makes a primary game wager, elects less than seven, greater than seven and/or exactly seven, and may also make an optional poker hand bonus game wager. In some embodiments, the bonus game wager is required and is some percentage (e.g., 50%) of the primary game wager. In other embodiments, the bonus game wager is not so limited. At 310, the player activates the game via a deal button or touch screen icon. At 315, two player cards are exposed. At 320, a sum value of the two players cards is determined. At 325, it is determined if a payout relative to the sum is due. If so, at 330, the payout is credited. The primary game payout may also be credited at the end of the game. If not, at 335, the primary game wager is collected by the device. At 340, the three bonus cards are exposed to form a five card poker hand. The three bonus cards and two primary cards may be exposed simultaneously as well. Also, while not shown, the player may be able to manipulate the bonus game wager after the two player cards are displayed. At 345, it is determined whether the player placed a bonus wager. If not, the flow chart loops to 305. If so, at 350, a poker rank of the two player cards and three bonus cards is determined. At 355, it is determined if the two player cards and three bonus cards form a winning poker hand. If so, at 360, the bonus payout is credited. If not, at 365, the bonus game wager is collected by the device. At 370, it is determined whether, based on a rank, value and/or position associated with the player cards, bonus cards or combinations thereof, a secondary bonus game is triggered. If so, at 375, the secondary bonus game is played and the secondary bonus game award is credited. In one embodiment, the secondary bonus game always results in a payout. If not, the flow chart 300 loops back to 305.

While the embodiments discussed above is directed to an electronic gaming device which is a stand alone device. However, those skilled in the art will recognize that the embodiments of the present invention can be implemented on a hand-held device (e.g., cellular phone, PDA, etc.), global computer network (e.g., Internet, server-based, etc.) and other electronic means. The embodiments of the present invention may also be used to facilitate a live and/or televised game show. The embodiments may be used as the focus of the show or may be used as a bonus- or award-generating feature associated with a different underlying game show.

Although the invention has been described in detail with reference to several embodiments, additional variations and modifications exist within the scope and spirit of the invention as described and defined in the following claims.

I claim:

1. A method comprising:

utilizing an electronic gaming device having at least a display and user interface, and in communication with a processor, for:

accepting a game wager on a game outcome;

accepting a bonus wager on a player hand rank;

randomly arranging on said electronic wagering device display a simulated deck of cards wherein said deck of cards includes at least two jokers, and ace through six of spade, heart, diamond and club suits, wherein jokers are ranked as an ace or six of any suit at the discretion of the player;

displaying on said electronic wagering device display two player cards face up;

displaying on said electronic wagering device display three bonus cards face up;

determining via said processor a value of the two player cards and resolving said game wager based on whether the player hand value is less than seven, greater than seven or exactly seven;

determining via said processor a rank of a player hand formed of said two player cards in combination with said three bonus cards; and triggering a secondary bonus game via said processor responsive to the two player cards having a sum value of seven and the three bonus cards having a sum value of seven.

2. The method of claim 1 further comprising utilizing a deck of fifty cards including two jokers and two identical sets formed of ace through six of spade, heart, diamond and club suits.

3. An electronic gaming device comprising:

a display;

a random number generator;

means for accepting a game wager on a game outcome and bonus wager on a player hand rank;

a processor configured to:

randomly arrange a simulated deck of cards wherein said deck of cards includes at least two jokers, and ace through six of spade, heart, diamond and club suits, wherein jokers are ranked as ace or six of any suit at the discretion of the player;

display two player cards face up on said display;

display three bonus cards face up on said display;

determine a value of the two player cards and resolve said game wager based on whether the player hand value is less than seven, greater than seven or exactly seven;

determine a rank of a player hand formed of said two player cards in combination with said three bonus cards; and trigger a secondary bonus game via said processor responsive to the two player cards having a sum value of seven and the three bonus cards having a sum value of seven.

4. The system of claim 3 wherein said deck of cards comprises fifty cards including two jokers and two identical sets formed of ace through six of spade, heart, diamond and club suits.

* * * * *